(12) United States Patent
Makela

(10) Patent No.: US 7,809,003 B2
(45) Date of Patent: Oct. 5, 2010

(54) METHOD FOR THE ROUTING AND CONTROL OF PACKET DATA TRAFFIC IN A COMMUNICATION SYSTEM

(75) Inventor: Riku-Ville Makela, Hyvinkaa (FI)

(73) Assignee: Nokia Corporation, Espoo (FI)

( * ) Notice: Subject to any disclaimer, the term of this patent is extended or adjusted under 35 U.S.C. 154(b) by 407 days.

(21) Appl. No.: 11/707,020

(22) Filed: Feb. 16, 2007

(65) Prior Publication Data

US 2008/0198861 A1  Aug. 21, 2008

(51) Int. Cl.
  *H04L 12/28* (2006.01)
  *H04L 12/56* (2006.01)
(52) U.S. Cl. ...................................... 370/401
(58) Field of Classification Search ........................ None
  See application file for complete search history.

(56) References Cited

U.S. PATENT DOCUMENTS

| 7,373,660 | B1 * | 5/2008 | Guichard et al. | 726/15 |
| 2003/0088787 | A1 | 5/2003 | Egevang | |
| 2006/0037071 | A1 * | 2/2006 | Rao et al. | 726/13 |
| 2006/0265339 | A1 * | 11/2006 | Vakil et al. | 705/76 |
| 2006/0294363 | A1 * | 12/2006 | Bae et al. | 713/153 |

FOREIGN PATENT DOCUMENTS

| EP | 1 189 410 A2 | 3/2002 |
| WO | WO 03/007561 A1 | 1/2003 |
| WO | WO 03/069828 A2 | 8/2003 |
| WO | WO 2004/004231 A1 | 1/2004 |

OTHER PUBLICATIONS

International Search Report PCT/FI2008/050060 dated Jun. 2, 2008.
3GPP TS 23.228 V6.14.0 (Jun. 2006); $3^{RD}$ Generation Partnership Project; Technical Specification Group Services and System Aspects; IP Multimedia Subsystem (IMS); Stage 2 (Release 6).3GPP Ts 23.060 V6.13.0 (2006-06); 3RD Generation Partnership Project; Technical Specification Group Services and System Aspects; General Packet Radio Service (Gprs); Service Description; Stage 2 (Release 6) C. Kaufman, Ed; Microsoft December 2005; Network Working Group; Internet Key Exchange (IKEV2) Protocol.
3GPP TS 23. 060 V6.13.0 (Jun. 2006); $3^{RD}$ Generation Partnership Project; Technical Specification Group Services and System Aspects; General Packet Radio Service (GPRS); Service Description; Stage 2 (Release 6).
C. Kaufman, Ed; Microsoft Dec. 2005; Network Working Group; Internet Key Exchange (IKEV2) Protocol.

* cited by examiner

*Primary Examiner*—Chirag G Shah
*Assistant Examiner*—Minh-Trang Nguyen
(74) *Attorney, Agent, or Firm*—Harrington & Smith

(57) ABSTRACT

The invention relates to a method, which comprising initiating the establishment of a security association between a client node and a gateway node. User data is obtained from an authentication server and the user is authenticated. Authorization is obtained for the user for certain network services from a separate authorization node. An authorized address is provided to the client node. The authorization is checked by the gateway node for the allowing outbound packets to specific destinations.

35 Claims, 7 Drawing Sheets

METHOD FOR THE ROUTING AND CONTROL OF PACKET DATA TRAFFIC IN A COMMUNICATION SYSTEM

BACKGROUND OF THE INVENTION

1. Field of the Invention

The invention relates to the providing of packet data access services in a communication system. Particularly, the invention relates to a method for the routing and control of packet data traffic in a communication system.

2. Description of the Related Art

The amount of packet data traffic continues to increase with the introduction of new multimedia services. It becomes important for packet data access networks to be able to transmit packet data in an efficient and a scalable way that avoids introducing bottlenecks to the architecture of the network. However, simultaneously it must be possible to control the packet data traffic and to apply a variety of policies for the packet data traffic. It must be possible to control the attaching of users to different sub-networks, for instance, in the form of deciding on the providing of addresses from a given access point only to authorized users. The routing and policy control must be efficient irrespective of the type of an access network.

A problem associated with prior art networks is that the burden of the routing of packet data traffic and the interfacing of external networks for the packet data traffic has been centralized to network elements in the same position in the network topological without taking into consideration the type of packet data traffic or the type of access network used.

Reference is now made to FIG. 1, which illustrates a Universal Mobile Telecommunications System (UMTS) and an IP multimedia Subsystem (IMS) in prior art. The IP multimedia architecture for UMTS and GPRS mobile communication networks is referred to as an IP Multimedia Subsystem (IMS). The IMS is defined in the 3G Partnership Project (3GPP) specification 23.228 version 6.14.0, June 2006. The GPRS is defined in the 3GPP specification 23.060, version 6.13.0, June 2006. In FIG. 1 there is shown a mobile station 100, which communicates with a Radio Network Controller (RNC) 114 within a Radio Access Network 110. The communication occurs via a Base Transceiver Station (BTS) 112. The radio access network 110 is, for example, a 2G GSM/EDGE radio access network or a 3G UMTS radio access network. An IP Connectivity Access Network (IP-CAN) functionality connected to access network 110 comprises at least a Serving GPRS Support Node (SGSN) 122 and a Gateway GPRS Support Node (GGSN) 124. An IP connectivity access network can also been seen as to comprise both a packet switched core network functionality 120 and an access network 110. The main issue is that an IP-CAN provides IP connectivity to user terminals towards an IP network such as the Internet or an Intranet. SGSN 122 performs all mobility management related tasks and communicates with a Home Subscriber Server (HSS) 160 in order to obtain subscriber information. GGSN 124 provides GPRS access points. There is an access point, for example, to a Media Gateway (MGW) 126, to a first router 142 attached to an IP network 140, and to a Proxy Call State Control Function (P-CSCF) 152. The access point to IP network is used to relay packets to/from an IP network node (IP-N) such as 147. The packets may be related to, for example, Internet browsing or File Transfer Protocol (FTP) file transfer. The access point for P-CSCF 152 is used to convey signaling traffic pertaining to IP multimedia. GGSN 124 establishes Packet Data Protocol (PDP) contexts, which are control records associated with a mobile subscriber such as mobile station 100. A PDP context provides an IP address for packets received from or sent to mobile station 100. A PDP context has also associated with it a UMTS bearer providing a certain QoS for mobile station 100. In GGSN 124 there is a primary PDP context for the signaling packets associated mobile station 100. For the user plane data packets carrying at least one IP flow there is established at least one secondary PDP context. The at least one IP flow is established between a calling terminal and a called terminal in association with an IP multimedia session. An IP flow carries a multimedia component, in other words a media stream, such as a voice or a video stream in one direction. For voice calls at least two IP flows are required, one for the direction from the calling terminal to the called terminal and one for the reverse direction. In this case an IP flow is defined as a quintuple consisting of a source port, a source address, a destination address, a destination port and a protocol identifier.

The communication system illustrated in FIG. 1 comprises also the IP Multimedia Subsystem (IMS) functionality. The IMS is used to set-up multimedia sessions over IP-CAN. The network elements supporting IMS comprise at least one Proxy Call State Control Function (P-CSCF), at least one Inquiring Call State Control Function (I-CSCF), at least one Serving Call State Control Function S-CSCF, at least one Brakeout Gateway Control Function (BGCF) and at least one Media Gateway Control Function (MGCF). As part of the IMS there is also at least one Home Subscriber Server (HSS). Optionally, there is also at least one Application Server, which provides a variety of value-added services for mobile subscribers served by the IP multimedia subsystem (IMS).

P-CSCF 152 receives signaling plane packets from GGSN 124. Session Initiation Protocol (SIP) signaling messages are carried in the signaling plane packets. The signaling message is processed by P-CSCF 152, which determines the correct serving network for the mobile station 100 that sent the signaling packet. The determination of the correct serving network is based on a home domain name provided from mobile station 100. Based on the home domain name is determined the correct I-CSCF, which in FIG. 1 is I-CSCF 154. I-CSCF 154 hides the topology of the serving network from the networks, in which mobile station 100 happens to be roaming. I-CSCF 154 takes contact to home subscriber server 160, which returns the name of the S-CSCF, which is used to determine the address of S-CSCF 156 to which the mobile station 100 is to be registered. If I-CSCF 156 must select a new S-CSCF for mobile station 100, home subscriber server 160 returns required S-CSCF capabilities for S-CSCF selection.

Upon receiving a registration, S-CSCF 156 obtains information pertaining to the profile of the mobile station 100 from HSS 160. The information returned from HSS 160 may be used to determine the required trigger information that is used as criterion for notifying an application server 162. The trigger criteria are also referred to as filtering criteria. Application server 162 may be notified on events relating to incoming registrations or incoming session initiations. Application server 162 communicates with S-CSCF 156 using the ISC-interface. The acronym ISC stands for IP multimedia subsystem Service Control interface. The protocol used on ISC interface is SIP. AS 162 may alter SIP INVITE message contents that it receives from S-CSCF 156. The modified SIP INVITE message is returned back to S-CSCF 156.

If the session to be initiated is targeted to a PSTN subscriber or a circuit switched network subscriber, the SIP INVITE message is forwarded to a BGCF 158. BGCF 158 determines the network in which interworking to PSTN or the circuit switched network should be performed. In case PSTN interworking is to be performed in the current network, the SIP INVITE message is forwarded to MGCF 159 from BGCF 158. In case PSTN interworking is to be performed in another network, the SIP INVITE message is forwarded from BGCF 158 to a BGCF in that network (not shown). MGCF 159 communicates with MGW 126. The user plane packets carrying a media bearer or a number of interrelated media bearers for the session are routed from GGSN 124 to MGW 126 as illustrated in FIG. 1.

If the session to be initiated is targeted to a terminal 146, which is a pure IP terminal, S-CSCF 156 forwards the SIP INVITE message to terminal 146. Terminal 146 communicates with a second router 144, which interfaces IP network 140. IP network 140 is used to carry the user plane IP flows associated with the session established between mobile station 100 and terminal 146. The user plane IP flows between first router 142 and GGSN 124 are illustrated with line 128. The user plane IP flows between second router 144 and terminal 146 are illustrated with line 148.

Generally, in FIG. 1 user plane is illustrated with a thick line and control plane with thinner line.

One problem in the architecture illustrated in FIG. 1 is, for example, that if there are other types of IP-CANs (not shown) that are used to access IMS 150 or the amount of user plane traffic grows by way of a myriad of IP multimedia sessions specifically GGSN 124 may be required to process significant packet data traffic. Therefore, it would be beneficial to have an architecture, which may provide for access point gateway functionality at different points in the network topology and avoids the buildup of network bottlenecks.

SUMMARY OF THE INVENTION

The invention relates to a method comprising: initiating the establishment of a security association between a client node and a first gateway node; obtaining at least one user identity and user authentication data from an authentication server; authenticating the user with the authentication data; providing said at least one user identity to a second gateway node; obtaining for the user authorization pertaining to at least one access point in said second gateway node; providing said authorization pertaining to said at least one access point and an address for said client node to said first gateway node; providing said address to said client node from said first gateway node; transmitting a packet from said client node to said first gateway node, said packet comprising said address as source address; allowing said packet based on said authorization pertaining to said at least one access point; and routing said packet to a destination node in said first gateway node based on at least said address.

The invention relates also to a method comprising: initiating the establishment of a security association between a client node and a first gateway node; obtaining at least one user identity and user authentication data from an authentication server; authenticating the user with the authentication data; providing said at least one user identity to a control node; obtaining for the user authorization pertaining to at least one access point to said first gateway node from said control node; obtaining an address for said client node in said first gateway node; providing said address to said client node from said first gateway node; transmitting a packet from said client node to said first gateway node, said packet comprising said address as source address; allowing said packet based on said authorization pertaining to said at least one access point; and routing said packet to a destination node in said first gateway node based on at least said address.

The invention relates also to a method comprising: initiating the establishment of a security association between a client node and a first gateway node; obtaining at least one user identity and user authentication data from an authentication server; authenticating the user with the authentication data; requesting the creation of a packet data protocol context from a second gateway node; creating a packet data protocol context in said second gateway node; determining session control node information in said second gateway node; providing said session control node information in at least one protocol configuration option to said first gateway node; providing said session control node information to said client node in a configuration payload of a security association related message.

The invention relates also to a communication system, comprising: a client node configured to initiate the establishment of a security association with a first gateway node, to transmit a packet to said first gateway node, said packet comprising an address as source address; a first gateway node configured to establish a security association with said client node, to obtain at least one user identity and user authentication data from an authentication server, to authenticate the user with the authentication data, to providing said at least one user identity to a second gateway node, to provide said address to said client node from said first gateway node, to receive said packet comprising said address as source address, to allow said packet based on said authorization pertaining to said at least one access point and to route said packet to a destination node based on at least said address; and a second gateway node configured to obtain for the user an authorization pertaining to at least one access point and to provide said authorization pertaining to said at least one access point and an address for said client node to said first gateway node.

The invention relates also to a communication system comprising: a client node configured to initiate the establishment of a security association towards a first gateway node; and a first gateway node configured to obtaining at least one user identity and user authentication data from an authentication server, to authenticate the user with the authentication data, to provide said at least one user identity to a control node, to obtain for the user authorization pertaining to at least one access point, to obtain an address for said client node, to providing said address to said client node, to receive a packet from said client node, said packet comprising said address as source address, to allowing said packet based on said authorization pertaining to said at least one access point and to route said packet to a destination node in said first gateway node based on at least said address.

The invention relates also to a communication system, comprising: a client node configured to initiate the establishment of a security association to a first gateway node; said first gateway node configured to obtain at least one user identity and user authentication data from an authentication server, to request the creation of a packet data protocol context from a second gateway node, to authenticate the user with the authentication data and to providing said session control node information to said client node in a configuration payload of a security association related message; and said second gateway node configured to create a packet data protocol context in said second gateway node, to determine session control node information in said second gateway node, to providing said session control node information in at least one protocol configuration option to said first gateway node.

The invention relates also to a network node, comprising: a security entity configured to establish a security association with a client node, to obtain at least one user identity and user authentication data from an authentication server, to authenticate the user with the authentication data, to providing said at least one user identity to a gateway node, to provide an address to said client node; a communication entity configured to receive said packet comprising said address as source address; a filtering entity configured to allow said packet based on said authorization pertaining to said at least one access point; and a router entity configured to route said packet to a destination node based on at least said address.

The invention relates also to a network node, comprising: means for establishing a security association with a client node; means for obtaining at least one user identity and user authentication data from an authentication server; means for authenticating the user with the authentication data; means for providing said at least one user identity to a gateway node; means for to providing an address to said client node; means for receiving a packet comprising said address as source address; means for allowing said packet based on said authorization pertaining to said at least one access point; and means for routing said packet to a destination node based on at least said address.

The invention relates also to a network node, comprising: a security entity configured to obtain at least one user identity and user authentication data from an authentication server, to authenticate the user with the authentication data, to provide said at least one user identity to a control node, to obtain for the user authorization pertaining to at least one access point, to obtain an address for said client node, to providing said address to said client node; a communication entity configured to receive a packet from said client node, said packet comprising said address as source address; a filtering entity configured to allow said packet based on said authorization pertaining to said at least one access point; and a routing entity configured to route said packet to a destination node based on at least said address.

The invention relates also to a network node, comprising: means for obtaining at least one user identity and user authentication data from an authentication server; means for authenticating the user with the authentication data; means for providing said at least one user identity to a control node; means for obtaining for the user authorization pertaining to at least one access point; means for obtaining an address for said client node; means for providing said address to said client node; means for receiving a packet from said client node, said packet comprising said address as source address; means for allowing said packet based on said authorization pertaining to said at least one access point; and means for routing said packet to a destination node based on at least said address.

The invention relates also to a network node, comprising: a security entity configured to establish a security association with a client node, to obtain at least one user identity and user authentication data from an authentication server, to request the creation of a packet data protocol context from a second gateway node, to authenticate the user with the authentication data and to providing said session control node information to said client node in a configuration payload of a security association related message.

The invention relates also to a network node, comprising: means for establishing a security association with a client node; means for obtaining at least one user identity and user authentication data from an authentication server; means for requesting the creation of a packet data protocol context from a second gateway node; means for authenticating the user with the authentication data; and means for providing said session control node information to said client node in a configuration payload of a security association related message.

The invention relates also to a computer program embodied on a computer readable medium, when executed on a data-processing system, the computer program being configured to perform: establishing a security association with a client node; obtaining at least one user identity and user authentication data from a server; authenticating the user with the authentication data; providing said at least one user identity to a gateway node; providing an address to said client node; receiving a packet comprising said address as source address; allowing said packet based on said authorization pertaining to said at least one access point; and routing said packet to a destination node based on at least said address.

The invention relates also to a computer program embodied on a computer readable medium, when executed on a data-processing system, the computer program being configured to perform: obtaining at least one user identity and user authentication data from an authentication server; authenticating the user with the authentication data; providing said at least one user identity to a control node; obtaining for the user authorization pertaining to at least one access point; obtaining an address for said client node; providing said address to said client node; receiving a packet from said client node, said packet comprising said address as source address; allowing said packet based on said authorization pertaining to said at least one access point; and routing said packet to a destination node based on at least said address.

The invention relates also to a computer program embodied on a computer readable medium, when executed on a data-processing system, the computer program being configured to perform: establishing a security association with a client node; obtaining at least one user identity and user authentication data from an authentication server; requesting the creation of a packet data protocol context from a second gateway node; authenticating the user with the authentication data; and providing said session control node information to said client node in a configuration payload of a security association related message.

In one embodiment of the invention, the communication system further comprises a communication entity in the second gateway node, which is configured to provide said at least one user identity to a control node. The control node, in other words, a control server, is, for example, an IP Multimedia Register (IMR), a Remote Authentication Dial In User Service (RADIUS) server, a Lightweight Directory Access Protocol (LDAP) database server or an Online Charging Server (OCS). A database entity in the control node is configured to determine said authorization pertaining to said at least one access point node with said at least one user identity. The communication entity in the control node is configured to indicate said authorization to said second gateway node.

In one embodiment of the invention, a session signaling entity in the client node is configured to add a session signaling message pertaining to a session to said packet. A session control node is configured to provide an indication of said session to the control node, which supervises, for example, user specific prepaid accounts. The control node configured to detect a session release condition for said session and to send a release request message to said first gateway node. The security entity in the first gateway node configured to delete a second security association.

In one embodiment of the invention, the second gateway node is a Gateway General Packet Radio Service Support Node.

In one embodiment of the invention, the user is a mobile subscriber, which is identified to the client node using a subscriber identity module or any other card.

In one embodiment of the invention, the first gateway node comprises a Virtual Private Network (VPN) gateway. In one embodiment of the invention, the first gateway node comprises a Serving GPRS Support Node.

In one embodiment of the invention, the communication system comprises an Internet Protocol Connectivity Access Network (IP-CAN) and a proxy network node with an application entity configured to receive signaling messages from a terminal via said Internet Protocol Connectivity Access Network (IP-CAN). The application entity may comprise Session Initiation Protocol (SIP) functionality. The proxy network node may be, for example, a Proxy CSCF (P-CSCF).

In one embodiment of the invention, the Internet Protocol Connectivity Access Network comprises a Serving General Packet Radio Service Support Node and a Gateway General Packet Radio Service Support Node. The first gateway node may be a Serving GPRS Support Node, which is configured to a communication entity that allows the first gateway node to communication towards a control node via the Radius protocol or the Diameter protocol. The second gateway may be a Gateway GPRS Support Node.

In one embodiment of the invention, the signaling messages comprise Session Initiation Protocol (SIP) session invitation messages.

In one embodiment of the invention, said communication system comprises a mobile communication network. In one embodiment of the invention, said terminal comprises a mobile station or generally a mobile terminal. In one embodiment of the invention a user of a mobile terminal is identified using a subscriber module, for example, User Services Identity Module (UMTS) or a Subscriber Identity Module (SIM). The combination of Mobile Equipment (ME) and a subscriber module may be referred to as a mobile subscriber.

In one embodiment of the invention, the communication system comprises at least one of a Global System of Mobile Communications (GSM) network and a Universal Mobile Telephone System (UMTS) network. The mobile station may be, for example, a GSM mobile station or a UMTS mobile station with a dual mode or multimode functionality to support different access types.

In one embodiment of the invention, the computer program is stored on a computer readable medium. The computer readable medium may be a removable memory card, a removable memory module, a magnetic disk, an optical disk, a holographic memory or a magnetic tape. A removable memory module may be, for example, a USB memory stick, a PCMCIA card or a smart memory card.

The embodiments of the invention described hereinbefore may be used in any combination with each other. Several of the embodiments may be combined together to form a further embodiment of the invention. A method, a communication system, a network node or a computer program to which the invention is related may comprise at least one of the embodiments of the invention described hereinbefore.

The benefits of the invention are related to the increased scalability. Packet data traffic may be distributed more evenly in different points within the network topology.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
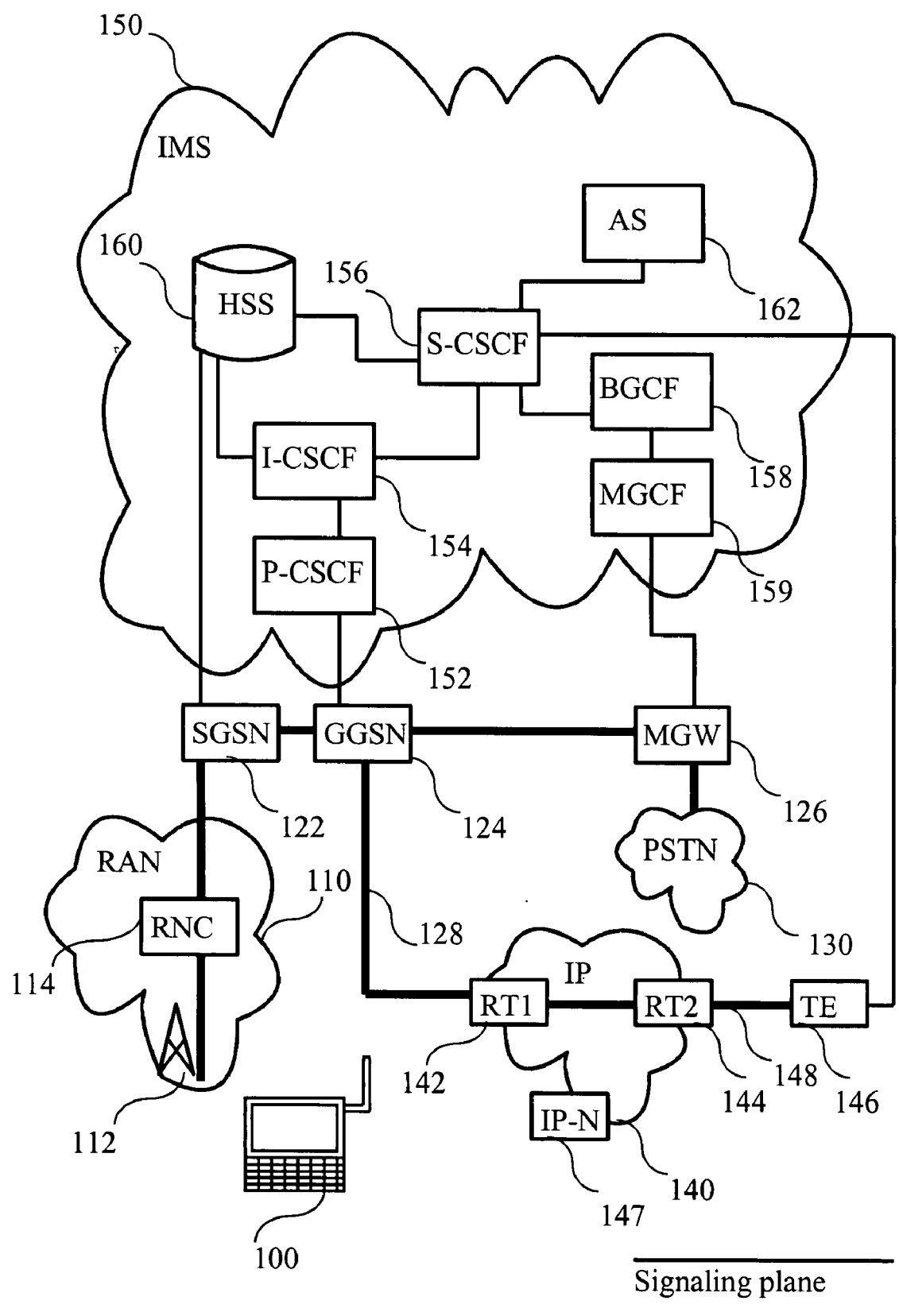
FIG. 1 is a block diagram illustrating a Universal Mobile Telecommunications System (UMTS) and an IP multimedia Subsystem (IMS) in prior art.
Figure 2:
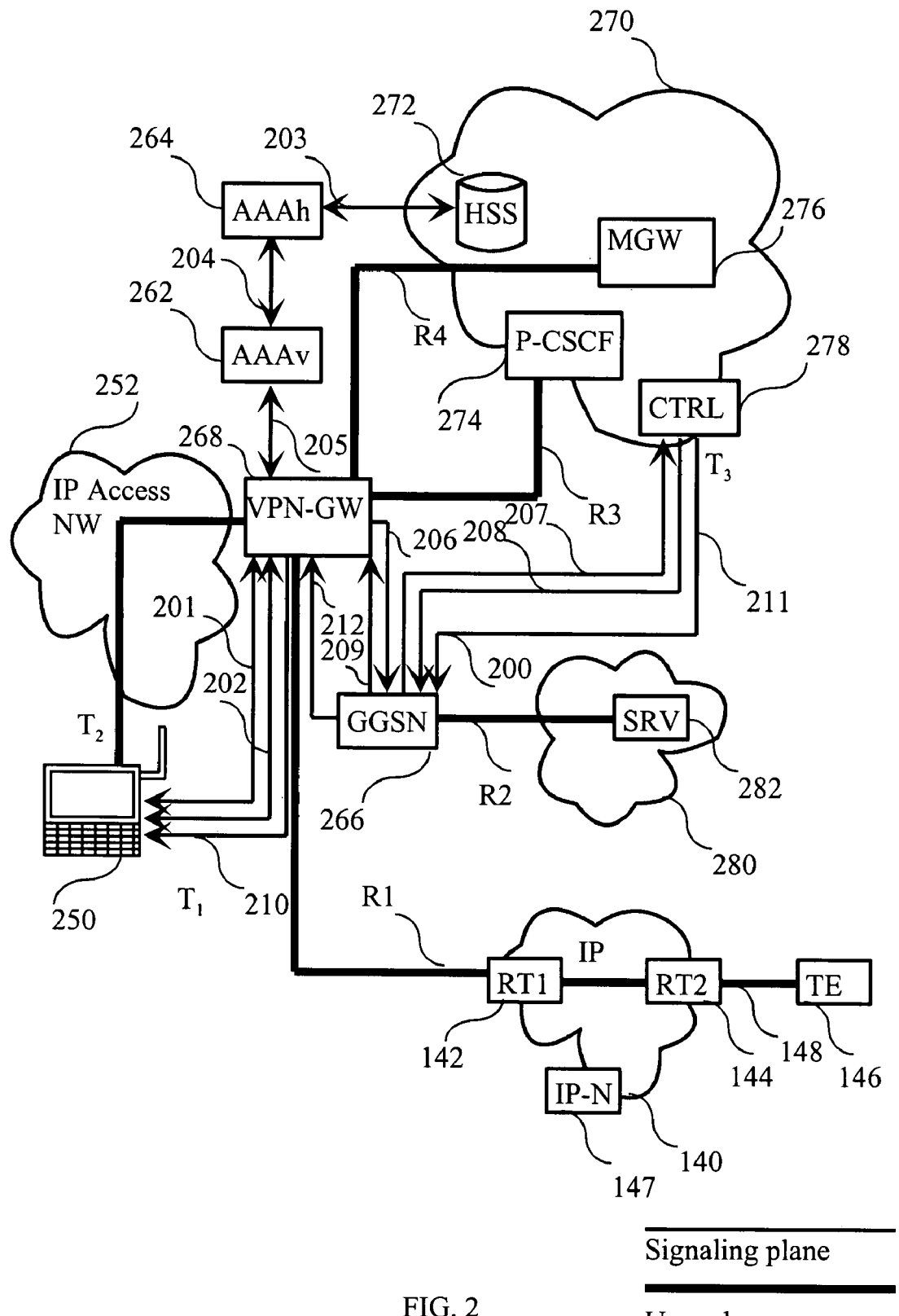
FIG. 2 is a block diagram illustrating a communication system with two gateway nodes in one embodiment of the invention.

FIG. 2 is a block diagram illustrating a communication system with two gateway nodes in one embodiment of the invention.

In FIG. 2 there is a client node 250. It communicates with an IP access network 252. The IP access network may be any wired or wireless network. In FIG. 2 there is also a Virtual Private Network gateway VPN-GW 268. VPN-GW 268 provides IP Security (IP-SEC) security associations for client nodes such as client node 250. The security associations are provided over IP access net-work 252. In FIG. 2 there are two authentication authorization and accounting servers, namely AAAv 262 and AAAh 264. AAAv 262 acts as the AAA server within the network of VPN-GW 268, whereas AAAh 264 acts as the AAA server within the home network of the mobile subscriber associated with client node 250. VPN-GW 268 communicates with AAAv 262 using either the Radius protocol or the Diameter protocol. Similarly, AAAv 262 communicates with AAAh 264 using the Radius or the Diameter protocol. There is also an interface from AAAh 264 to the Home Subscriber Server (HSS) of the mobile sub-scriber. In FIG. 2 there is also an IP multimedia subsystem 270. There is a Proxy Call State Control Function (P-CSCF) 274 and a media gateway 276 in IP multimedia subsystem (IMS) 270. There is also a home subscriber server 272 within IMS 270. HSS 272 is configured to communicate with AAAh 264. There is also a Control Server (CTRL) 278. Control server 278 may be, for example, an LDAP server storing a directory database, an Online Charging Server (OCS) or an IP Multimedia Register (IMR). Control server 278 is, for example, in charge of providing user data and user service subscription information. Mobile subscriber subscription information indicates, for example, information on access point names that are allowed for specified mobile subscribers. The subscriber information also indicates what sub-networks are allowed as destination networks for specified subscribers and what quality of service may be provided for the packet traffic pertaining to the specified subscribers. There may also be information on pre-paid accounts associated with the mobile subscriber. Control server 278 may also be a session information repository. In one embodiment of the invention, the control server is merely a software component or a separate computer plug-in unit directly comprised in a GGSN 266 or a similar gateway node. There is also a sub-network 280 which comprises a server 282. In FIG. 2 there is also a second sub network 140, which comprises a node 147 and an ingress router 142 and an egress router 144. There is also a second terminal 146 which is configured to communicate with sub-network 140 via user plane connection 148. In FIG. 2 there is also gateway GPRS support node GGSN 266.

At time $T_1$ client node 250 wishes to establish an IPSEC security association towards VPN-GW 268. The security association initiation is performed, for example, with Internet Key Exchange (IKE) IKEv2 protocol defined in Internet Engineering Task Force (IETF) document 4306, December, 2005. It should be noted that other versions of IKE, may as well be used for the purposes of the disclosed method. Also other key exchange protocols may be used for the establishing of security associations or secure tunnels.

The security association initiation phase, called IKE_SA_INIT in IKEv2, between client node 250 and VPN-GW 268 is illustrated with double-headed arrow 201. Thereupon, the IKEv2 authentication phase, called IKE_AUTH in IKEv2, is commenced. The IKEv2 authentication phase is illustrated with double-headed arrow 202. First, client node 250 sends an IKEv2 authentication message to VPN-GW 268. The authentication message does not have an IKEv2 AUTH payload, which indicates the desire of client node 250 to use extensible authentication, for example, the Encapsulated Authentication Protocol (EAP), which is defined, for example, in the IETF RFC 4187. The IKEv2 authentication message provides the identity of the current user of client node 250 and the name of the access point desired by the user. The identity of the user is expressed as a Network Access Identifier (NAI). The user may, for example, be identified within NAI using a logical name such as the ones used in E-mail address username parts or an MSISDN number. Upon obtaining the NAI in VPN-GW 268, the NAI is provided by VPN-GW 268 to AAAh 264 via AAAv 262. This message chain is not shown in FIG. 2. The correct AAAh is found using the mobile country code and mobile network code provided as part of the NAI. On the basis of the user identity in NAI, AAAh 264 obtains authentication information from HSS 272, as illustrated with arrow 203. AAAh 264 may also obtain from HSS 272 other data for the user, which comprises, for example, an IMSI and an MSISDN. The user identities IMSI and MSISDN may be referred to as user data hereinafter. User data and authentication information is provided from AAAh 264 to AAAv 262, as illustrated with arrow 204. The user data and authentication information are further provided from AAAv 262 to VPN-GW 268, as illustrated with arrow 205. As part of ongoing IKEv2 authentication phase (IKE_AUTH) and the message exchange associated therewith, which illustrated with double-headed arrow 202, VPN-GW 268 sends to client node 250 an IKEv2 authentication message. The IKEv2 authentication message has encapsulated within it an Encapsulated Authentication Protocol (EAP) authentication request message pertaining to, for example, EAP-SIM or EAP-AKA authentication methods. The EAP authentication request message comprises, for example, a random challenge (RAND) and may also comprise a network authentication token (AUTN) and a Message Authentication Code (MAC). In order to obtain successful authentication, client node 250 sends a proper response parameter (RES), calculated in client node 250 on the basis of information in the EAP authentication request, to VPN-GW 268 in an EAP authentication response message further encapsulated in an IKE_AUTH message, which is, once again part of message exchange illustrated with double-headed arrow 202. Upon receiving the EAP authentication request message, VPN-GW 268 checks at least the given RES and finds it correct. Because the RES was correct, WPN-GW 268 sends an EAP success message encapsulated in an IKE_AUTH message to client node 250. This message is also part of the message exchange illustrated with double headed arrow 202.

At this point a PDP context is not opened in GGSN 266. VPN-GW 268 sends a first authorization message comprising the user identities IMSI and MSISDN and the requested APN to GGSN 266, as illustrated with arrow 206. The first authorization request message may be sent, for example, using the GPRS Tunneling Protocol (GTP-C), the Radius protocol or the Diameter protocol. GGSN 266 sends a second authorization request message to control server 278 as illustrated with arrow 207. The second authorization request message comprises the IMSI and MSISDN and the desired APN. Control server 278 checks from its database the authorization of the user to use the APN requested. If there is an authorization, control server 278 sends an authorization accepted message to GGSN 266, as illustrated with arrow 208. GGSN 266 allocates an IP address from the APN. The IP address allocation may also be performed by control server 278 or the address may already have been provided in message 208 to GGSN 266. GGSN 266 sends the IP address to VPN-GW 268, as illustrated with arrow 209. The IP address is further provided from VPN-GW 268 to client node 250, as illustrated with arrow 210.

In one embodiment of the invention, the providing of the IP address to client node 250 is performed in an earlier phase when the authentication is still ongoing. The IP address may be provided in association with an extra IKE_AUTH message exchange between client 250 and VPN-GW 268.

At time $T_2$, client node 250 starts using the IP address obtained. Thereupon, client node 250 sends a session related packet to VPN-GW 268. Upon receiving the packet VPN-GW 268 checks from its firewall rules whether the access point for the source IP address is allowed to communicate with the destination IP address indicated in the packet. If the firewall rules allow the packet, the packet is routed towards the destination by VPN-GW 268. In FIG. 2 there are shown four routes for packet traffic, namely route R1 towards sub-network 140, route R2 towards sub-network 280, route R3 towards P-CSCF 274 and route R4 towards MGW 276. Based on routing rules, VPN-GW 268 sends the session signaling related packet over route R3 to P-CSCF 274. At some point in session signaling P-CSCF 274 sends a response signaling message comprised in a packet towards client node 250. The response packet is processed in VPN-GW 268 so that is it subjected to firewall rule checking and routing process in a manner similar to packet sent by client node 250. Finally the packet is assumed to be received to client node 250. At a later time, a multimedia session is assumed to be established from client node 250 via VPN-GW 268 to a destination node, for example, network node 146. The user plane for the session uses an IPSEC security association between client node 250 and VPN-GW 268. The IP multimedia session goes on for a certain time. At time $T_3$ control server 278 detects that the prepaid account associated with the mobile subscriber for client node 250 has been exhausted. Therefore, control server 278 sends a session release request message GGSN 266, as illustrated with arrow 211. The session release request message is sent further by GGSN 266 to VPN-GW 268, as illustrated with arrow 212. In response to the release request VPN-GW 268 deletes the security association used by the ongoing IP multimedia session. Preferably, the user plane security association is deleted.

Figure 3:
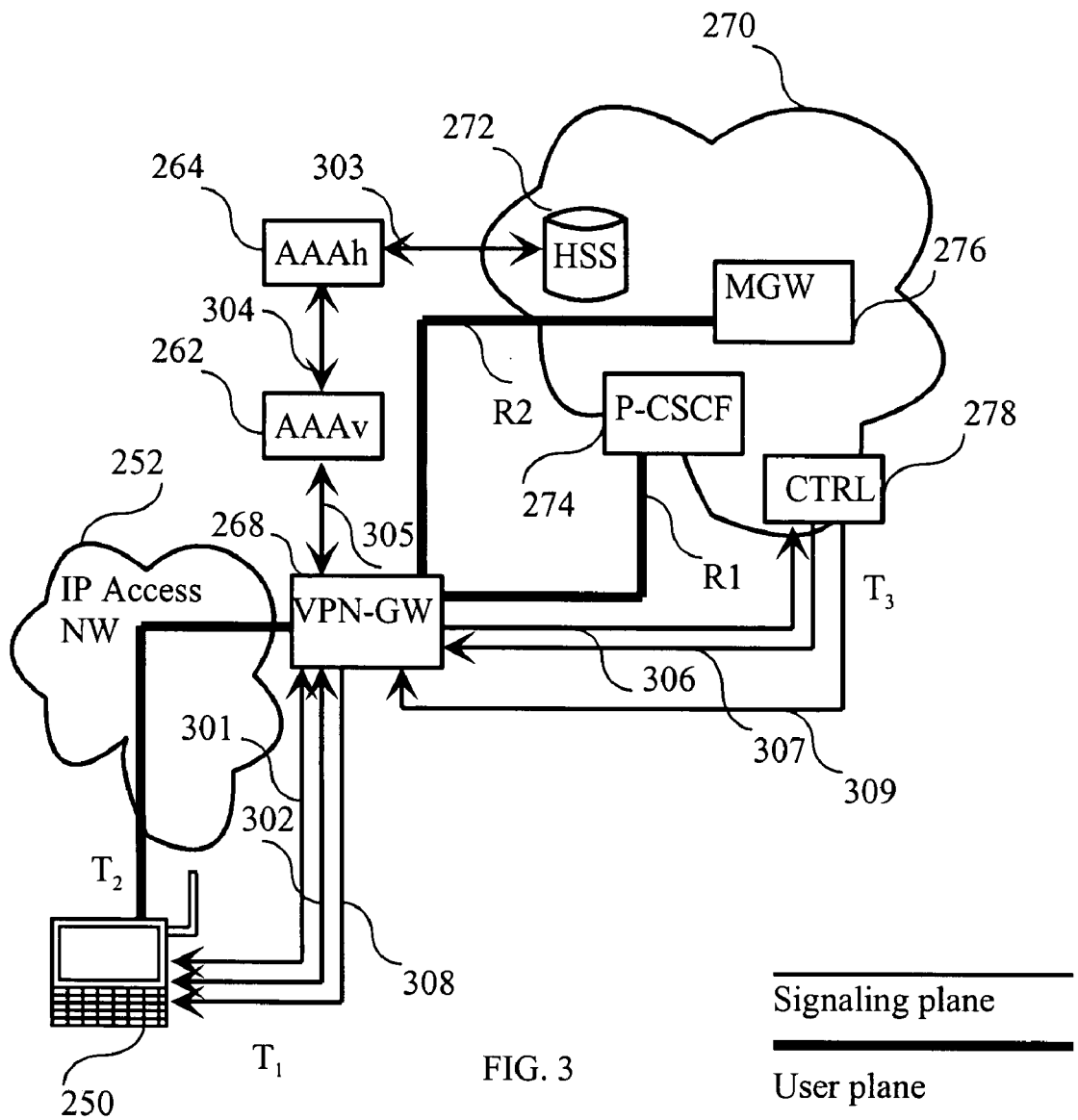
FIG. 3 is a block diagram illustrating a single gateway node communication system in one embodiment of the invention.

FIG. 3 is a block diagram illustrating a single gateway node communication system in one embodiment of the invention.

In FIG. 3 there is no GGSN but all policy signaling is relayed via VPN-GW 268 and control server 278. At time $T_1$ client node 250 initiates the establishing of a security association towards VPN-GW 268. The security association initiation (IKE_SA_INIT) is illustrated with double-headed arrow 301. Thereupon, the IKEv2 authentication phase (IKE_AUTH) is commenced. Client node 250 sends an IKEv2 authentication message to VPN-GW 268, as part of authentication phase messaging illustrated with double-headed arrow 302. The IKEv2 authentication message provides the identity of the current user of client node 250 and the name of the access point desired by the user. The identity of the user is expressed as a Network Access Identifier (NAI). Upon obtaining the NAI in VPN-GW 268, the NAI is provided by VPN-GW 268 to AAAh 264 via AAAv 262 (not shown). The correct AAAh is found using the mobile country code and mobile network code provided as part of the NAI. On the basis of the user identity in NAI, AAAh 264 obtains authentication information from HSS 272, as illustrated with arrow 303. The authentication information may comprise a number of GSM authentication triplets or a number of UMTS AKA authentication vectors. AAAh 264 may also obtain from HSS 272 other data for the user, which comprises, for example, an IMSI and an MSISDN. The user identities IMSI and MSISDN may be referred to as user data hereinafter. User data and authentication information is provided from AAAh 264 to AAAV 262, as illustrated with arrow 304. The user data and authentication information are further provided from AAAv 262 to VPN-GW 268, as illustrated with arrow 305. Thereupon, the authentication is performed between client node 250 and VPN-GW 268. The continued authentication procedure between VPN-GW 268 and client node 250 is comprised in the messaging illustrated with double-headed arrow 302. The authentication procedure uses IKEv2 authentication phase (IKE_AUTH) messages, which have encapsulated in them Encapsulated Authentication Protocol (EAP) message pertaining to, for example, EAP-SIM or EAP-AKA authentication methods. The EAP challenge and response authentication procedures are performed. Successful authentication of client node 250 is followed by and EAP success message from VPN-GW 268 to client node 250.

Thereupon, VPN-GW 268 sends an authorization request message to control server 278 as illustrated with arrow 306. The authorization request message comprises APN desired by client node 250 and user data identifying the user of client node 250, for example the IMSI or the MSISDN of the user. If the user is authorized to use the APN, control server 278 sends an authorization accept message VPN-GW 268 as illustrated with arrow 307. The IP address for client node 250 may be obtained from control server 278 or from another node interfaced by VPN-GW 268. Anyway, the IP address allocated from the access point identified by the APN is provided from VPN-GW 268 to client node 250, as illustrated with arrow 308. The message 308 may be comprised in the IKEv2 authentication phase.

In one embodiment of the invention, the IP address may also be provided in an informational IKEv2 message only after complete IKEv2 authentication phase. In one embodiment of the invention, the sending of authorization request to control server 278 may be sent during authentication messaging process illustrated with double-headed arrow 305.

At time $T_2$ client node 250 starts establishing an IP multimedia session towards destination terminal. The IP multimedia session is established via for example session initiation protocol signaling, which is conveyed via VPN-GW 268 to P-CSCF 274 and from there onwards to other call state control functions that are not shown. The IP multimedia session is assumed to reach a two-way communication state, for example, a speed state. The IP multimedia session is also made known control server 278 (messaging not shown).

At time $T_3$, the prepaid account for the use of client node 250 is exhausted and therefore control server 278 sends a session release request message to VPN-GW 268 as illustrated with arrow 309. In response to the session release request VPN-GW 268 deletes the security association carrying at least the user plane packets for the IP multimedia session. In one embodiment of the invention all security associations established between client node 250 VPN-GW 268 are deleted.

Figure 4:
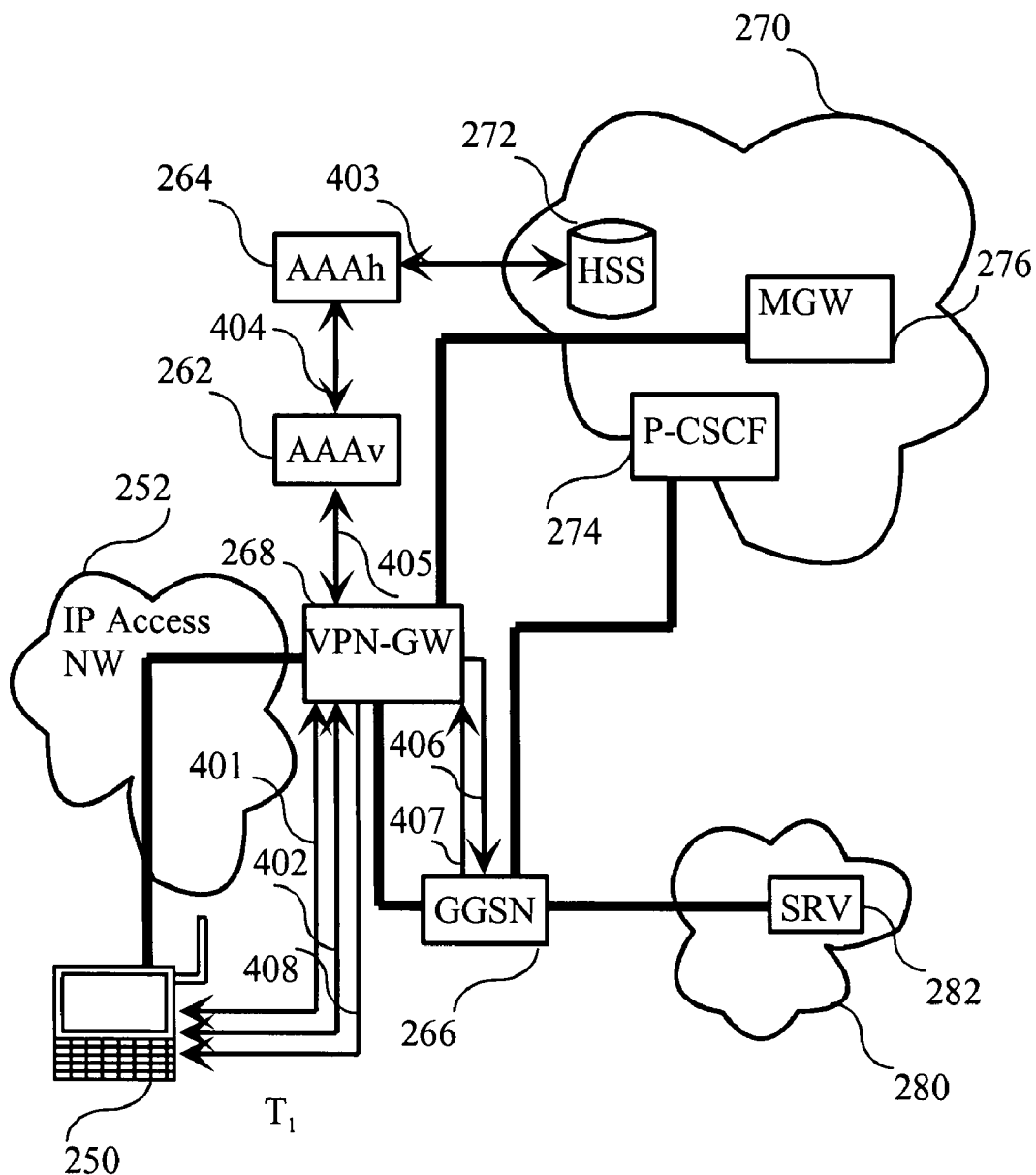
FIG. 4 is a block diagram illustrating the distribution of session control node information in one embodiment of the invention.

FIG. 4 is a block diagram illustrating the distribution of session control node information in one embodiment of the invention.

In FIG. 4 there is a VPN-GW 268 which communicates with a GGSN 266. There is also transmitted user plane packet traffic between VPN-GW 268 and GGSN 266. In FIG. 4 GGSN 266 is used to provide the P-CSCF address for P-CSCF 274 to client node 250. At time $T_1$ client node 250 wishes to establish an IPSEC security association between client node 250 and VPN-GW 268. VPN-GW 268 authenticates client node 250 in a manner similar to FIGS. 2 and 3. The initiation of security association establishment between client node 250 and VPN-GW 268 is illustrated with double-headed arrow 401. The IKEv2 authentication phase is started, as illustrated with double-headed arrow 402. Client node 250 provides user identity for it's user to VPN-GW 268. A NAI is sent from VPN-GW 268 to AAAh 264 via AAAv 262. The authentication information and user identity information from HSS 272 are provided back to VPN-GW 268 via the reverse path, as illustrated with arrows 403, 404 and 405. EAP authentication challenge and response messaging is performed over between client node 250 and VPN-GW 268 as part of IKEv2 authentication phase.

Thereupon, VPN-GW 268 starts PDP context establishment to GGSN 266, as illustrated with arrow 406. Beforehand GGSN 266 has been configured with configuration information comprising, for example, the address for P-CSCF 274. As the create PDP context request message 406 arrives at GGSN 266, it is responded by GGSN 266 with create PDP context request accept message, as illustrated with arrow 407. To the create PDP context request accept message or any other GTP-C protocol message GGSN 266 adds a protocol configuration option, which comprises the P-CSCF address. As the create PDP context request accept message is received in VPN-GW 268, the P-CSCF address and other similar configuration option fields are extracted by VPN-GW 268. VPN-GW 268 provides the IP address to client node 250 in an IKEv2 authentication related message illustrated with arrow 408, to which it adds a configuration payload, which further comprises the P-CSCF address. Thereupon, client node 250 may start establishing a SIP session via P-CSCF 274 further towards IP multimedia subsystem 270.

Figure 5A:
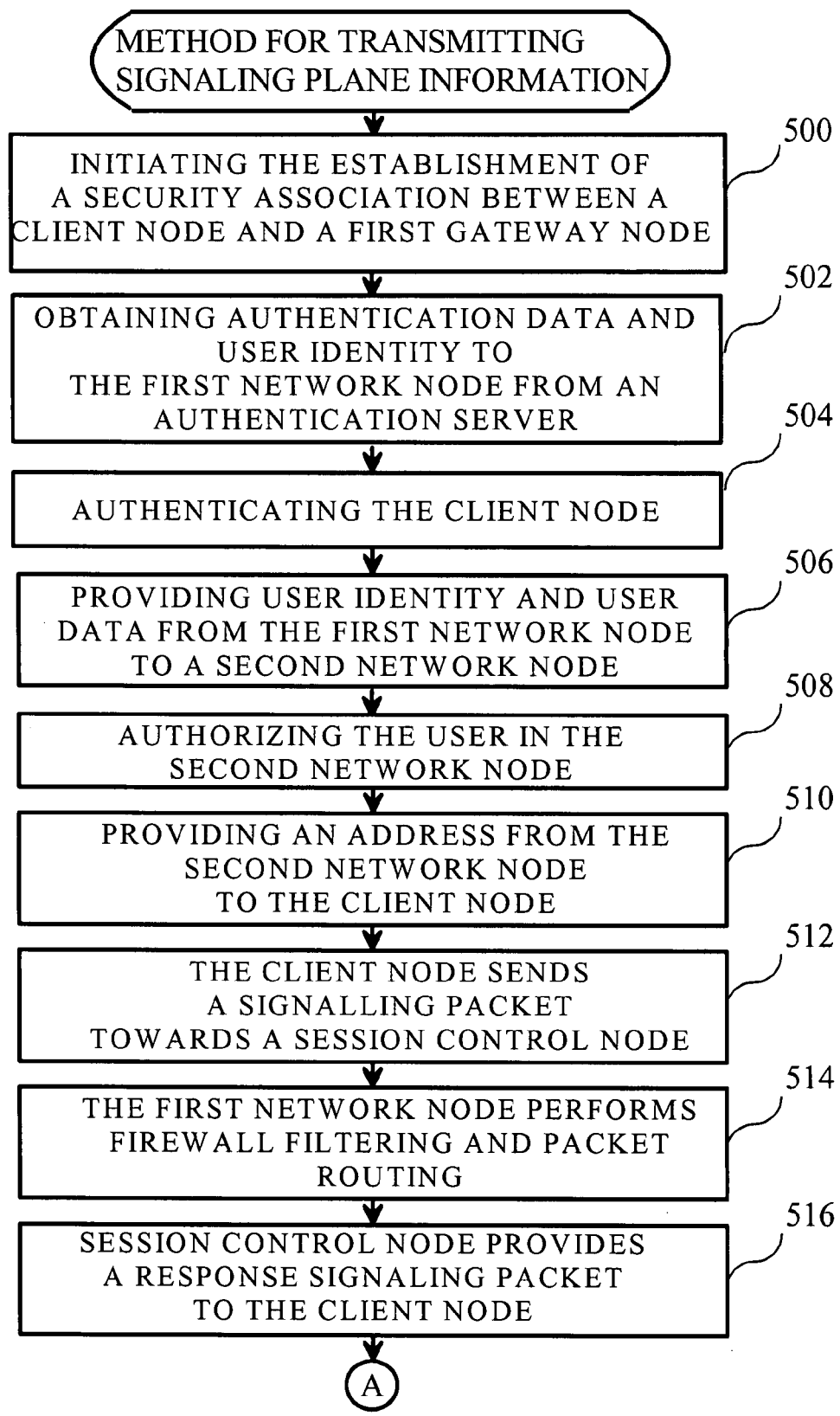
FIG. 5A is a flow chart illustrating a first part of a method for the transmitting of signaling plane information in one embodiment of the invention.

FIG. 5A is a flow chart illustrating a first part of a method for the transmitting of signaling plane information in one embodiment of the invention.

At step 500, an association establishment is started between a client node and a first network node. In one embodiment of the invention the first network node is a virtual private network gateway comprising firewall functionality and a router functionality.

At step 502, authentication data is obtained to the first network node from an authentication server using an identity provided by the client node at step 500. In one embodiment of the invention the authentication server is an authentication authorization and accounting server that is an AAA server. An AAA server may contact another AAA server in the client's home network. An AAA server may obtain authentication information from an external source such as an authentication center within a GSM network. User identity and user data is obtained to the first network node from the authentication server. The user identity may comprise, for example, an IMSI or an MSISDN. The user data may comprise an access point name provided from the client node.

At step 504, the client node authentication is continued.

At step 506, the user identity and user data is provided from the first network node to the second network node. In one embodiment of the invention, the second network node is a GGSN.

At the step 508, the user is authorized in the second network node. In one embodiment of the invention, the authorization comprises the user's right to obtain an IP address from a certain access point. In one embodiment of the invention, the authorization is checked from a further third network node, which is, for example, an LDAP directory server, a Radius server or an IP multimedia register comprising user authorization information pertaining to different services and access points.

At the step 510, an address is provided from the second network node to the client node. In one embodiment of the invention, the address is an IP address. In one embodiment of the invention the IP address is provided in an IKE version 2 informational message in a configuration payload parameter. In one embodiment of the invention, the IP address is provided in an IKEv2 authentication message.

At the step 512, the client node sends a signaling packet toward a session control node. In one embodiment of the invention the signaling packet is an IP packet comprising a session initiation protocol message. The session control node may for example a proxy call state control function pertaining to IP multimedia subsystem.

At the step 514, the first network node performs firewall filtering and packet routing for the aforementioned packet.

At the step 516, the session control node provides a response signaling to the client node. The method continues at the step 518 also labeled with letter A.

Figure 5B:
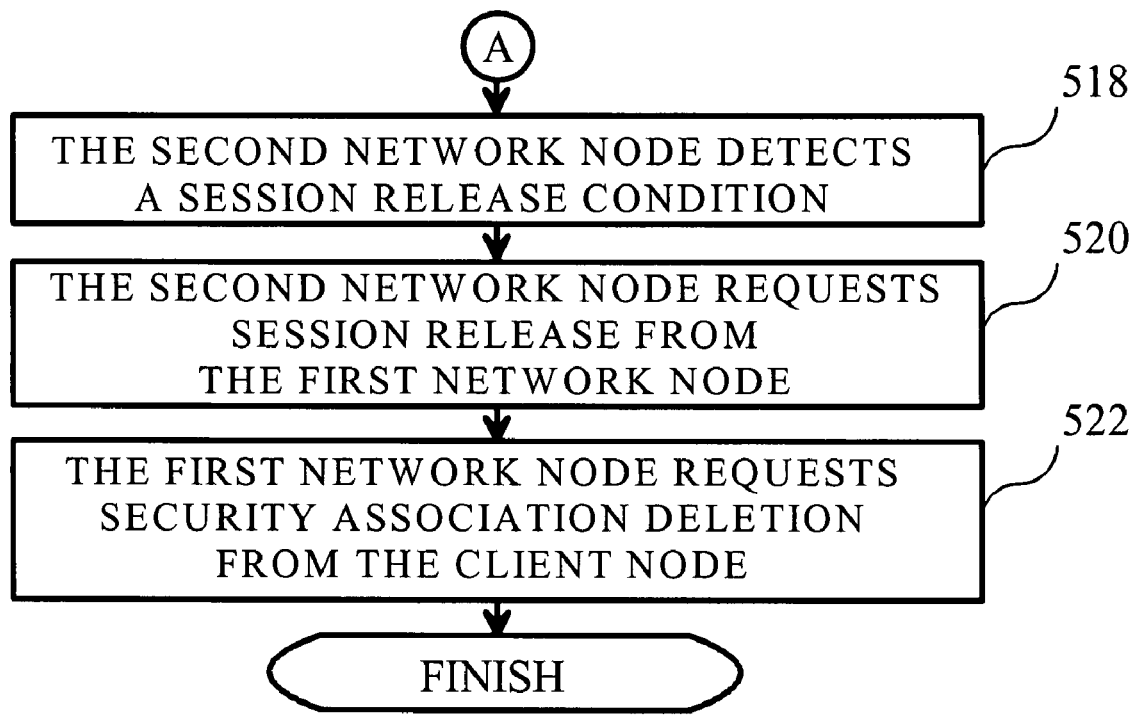
FIG. 5B is a flow chart illustrating a second part of a method for the transmitting of signaling plane information in one embodiment of the invention.

FIG. 5B is a flow chart illustrating a second part of a method for the transmitting of signaling plane information in one embodiment of the invention.

At the step 518, a second network node detects a session release condition. The session release condition may have been indicated from the third network node. The third network node for example supervises prepaid account exhaustion.

At the step 520, the second network node requests session release form the first network node.

At the step 522, the first network node requests secure association deletion from the client node. In one embodiment of the invention the security association carries the user plane packets pertaining to the multimedia session to be released.

Figure 6:
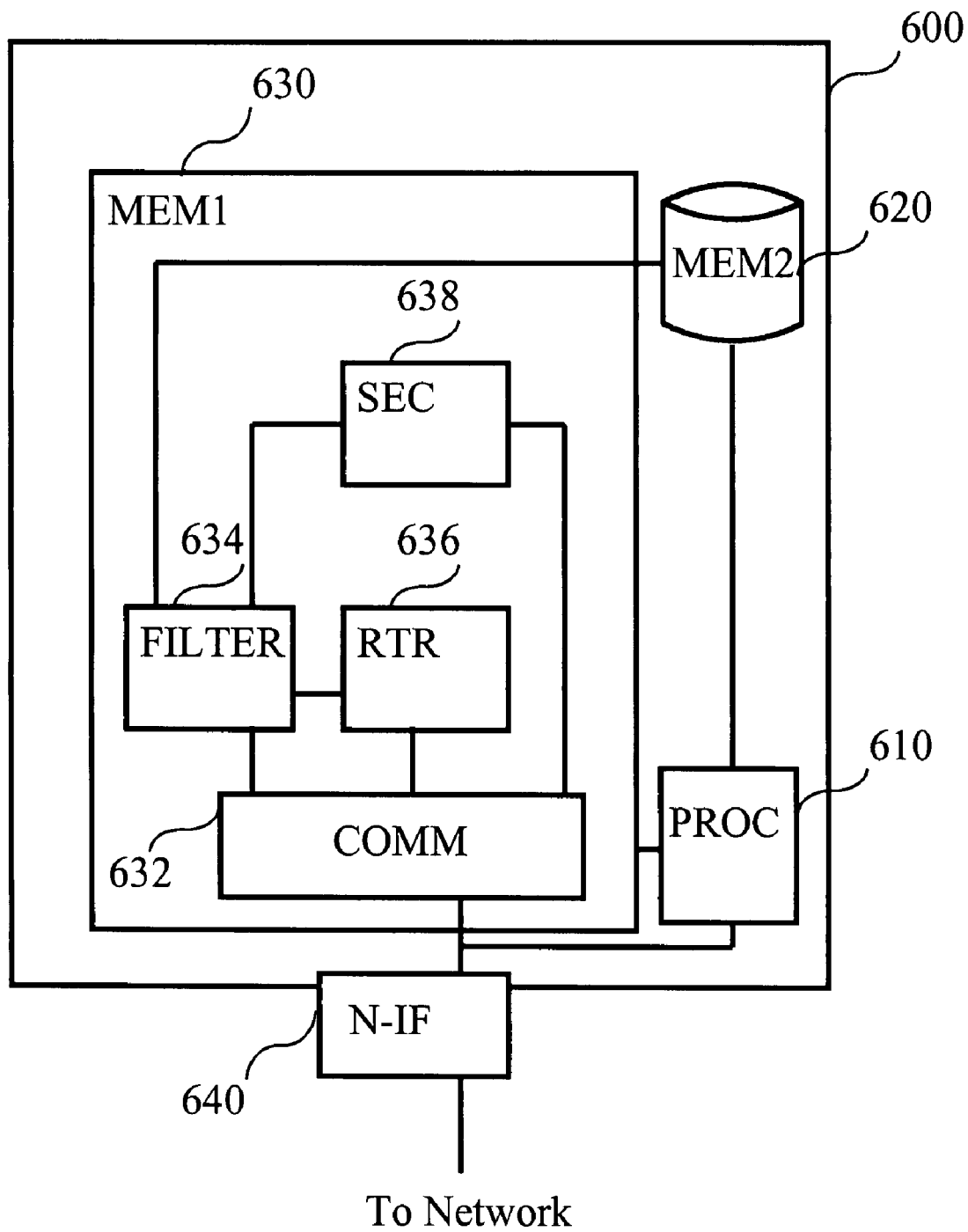
FIG. 6 is a block diagram illustrating a network node in one embodiment of the invention.

FIG. 6 is a block diagram illustrating a network node in one embodiment of the invention. The network node acts as, for example, a VPN gateway as illustrated in FIGS. 2, 3 and 4.

In FIG. 6 there is illustrated a network node 600. Network node 600 comprises at least one processor, for example, processor 610, at least one secondary memory, for example secondary memory 620 and at least one primary memory, for example, primary memory 630. Network node 600 may also comprise any number of other processors and any number secondary memory units. There may also be other primary memories with separate address spaces. Network node 600 comprises also a network interface 640. The network interface may, for example, be a cellular radio interface, a Wireless Local Area Network (WLAN) interface, a local area network interface or a wide area network interface. The network interface is used to communicate to the Internet or locally to at least one computer.

Processor 610 or at least one similarly configured processor within network node 600 executes a number of software entities stored at least partly in primary memory 630. Primary memory 630 comprises a communication entity 632, a filtering entity 634, a routing entity 636 and an authentication entity 638. Communication entity 632 communicates with remote network nodes for enabling them to communicate with other entities within network node 600. Communication entity 632 comprises, for example, the Internet Protocol (IP) protocol stack, the IP stack together with the Diameter protocol, the Radius protocol or any successor protocol thereof. Authentication entity 638 communicates with an authentication server via communication entity 632. Authentication entity may authenticate a client node, for example, using the IKEv2 protocol and at least one EAP authentication method such as EAP-SIM or EAP-AKA. Filtering entity 634 takes care of packet filtering and passing functions according to filtering rules. The filtering rules may be stored to secondary memory 620. The filtering rules may be updated based on information obtained from communication entity 632.

The entities within network node 600 such as communication entity 632, filtering entity 634, routing entity 636 and authentication entity 638 may be implemented in a variety of ways. They may be implemented as processes executed under the native operating system of the network node or the network node. The entities may be implemented as separate processes or threads or so that a number of different entities are implemented by means of one process or thread. A process or a thread may be the instance of a program block comprising a number of routines, that is, for example, procedures and functions. The entities may be implemented as separate computer programs or as a single computer program comprising several modules, libraries, routines or functions implementing the entities. The program blocks are stored on at least one computer readable medium such as, for example, a memory circuit, a memory card, a holographic memory, magnetic or optic disk. Some entities may be implemented as program modules linked to another entity. The entities in FIG. 6 may also be stored in separate memories and executed by separate processors, which communicate, for example, via a message bus or an internal network within the network node. An example of such a message bus is the Peripheral Component Interconnect (PCI) bus. The internal network may be, for example, a local area network. The entities may also be partly or entirely implemented as hardware, such as ASICS or FPGAs. An entity may be a software component or a combination of software components.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
   initiating an establishment of a security association between a client node and a first gateway node, where initiating comprises at least one authentication message communicated between the client node and the first gateway node indicating a name of an access point;
   obtaining at least one user identity and user authentication data for a user of the client node from an authentication server;
   authenticating the user with the authentication data and establishing the security association;

providing said at least one user identity and an indication of said access point to a second gateway node;
obtaining for the user an authorization pertaining to said access point and an address allocated from said access point;
providing said address to said client node from said first gateway node;
receiving a packet from said client node, said packet comprising said address as a source address;
allowing said packet based on said authorization pertaining to said at least one access point and firewall rules allowing communication by said access point for said source address to a destination address indicated in said packet; and
routing, by the first gateway node, said packet toward a destination node based on at least said destination address.

2. The method according to claim 1, wherein said packet comprises session initiation protocol signaling in order to establish a session between said client node and said destination node via the first gateway node.

3. The method according to claim 2, the method further comprising:
providing an indication of said session to said a control node;
receiving, at said first gateway node, a release request message from said control node; and
in response to said release request message, deleting said security association in said first gateway node.

4. The method according to claim 1, wherein said second gateway node is a gateway general packet radio service support node.

5. The method according to claim 1, wherein said user is a mobile subscriber.

6. The method according to claim 1, wherein said first gateway node is a virtual private network gateway.

7. The method according to claim 1, wherein said at least one user identity comprises at least one of a mobile subscriber integrated services digital network number, an international mobile subscriber identity, a session initiation protocol uniform resource identifier, an electronic mail address and a logical name.

8. A method, comprising:
initiating an establishment of a security association between a client node and a first gateway node, where initiating comprises at least one authentication message communicated between the client node and the first gateway node indicating a name of an access point;
obtaining at least one user identity and user authentication data for a user of the client node from an authentication server;
authenticating the user with the authentication data and establishing the security association;
providing said at least one user identity and an indication of said access point to a control node;
obtaining for the user an authorization pertaining to said access point from said control node;
obtaining an address allocated from said access point for said client node by said first gateway node;
providing said address to said client node from said first gateway node;
receiving a packet from said client node, said packet comprising said address as a source address;
allowing said packet based on said authorization pertaining to said at least one access point and firewall rules allowing communication by said access point for said source address to a destination address indicated in said packet; and
routing, by said first gateway device, said packet toward a destination node based on at least said destination address.

9. A method, comprising:
initiating an establishment of a security association between a client node and a first gateway node, where initiating comprises at least one authentication message communicated between the client node and the first gateway node indicating a name of an access point;
obtaining at least one user identity and user authentication data for a user of the client node from an authentication server;
authenticating the user with the authentication data and establishing the security association;
requesting a creation of a packet data protocol context from a second gateway node;
creating a packet data protocol context in said second gateway node;
determining session control node information in said second gateway node;
providing said session control node information in at least one protocol configuration option of said packet data protocol context to said first gateway node;
providing said session control node information to said client node in a configuration payload of a security association related message.

10. The method according to claim 9, wherein said second gateway node is a Gateway General Packet Radio Service Support Node.

11. The method according to claim 9, wherein the session control node information is used by at least the second gateway node to control a session between the client node and a destination node established via the first gateway node.

12. The method according to claim 9, wherein said at least one user identity comprises at least one of a mobile subscriber integrated services digital network number, an international mobile subscriber identity, a session initiation protocol uniform resource identifier, an electronic mail address and a logical name.

13. The method according to claim 8, wherein said packet comprises session initiation protocol signaling in order to establish a session between the client node and the destination node via the first gateway node.

14. The method according to claim 8, wherein said second gateway node is a gateway general packet radio service support node.

15. The method according to claim 8, wherein said user is a mobile subscriber.

16. The method according to claim 8, wherein said first gateway node is a virtual private network gateway.

17. The method according to claim 8, wherein said at least one user identity comprises at least one of a mobile subscriber integrated services digital network number, an international mobile subscriber identity, a session initiation protocol uniform resource identifier, an electronic mail address and a logical name.

18. A network node, comprising:
at least one processor; and
at least one memory storing computer program code, where the at least one memory storing the computer program code is configured, by the at least one processor, to cause the network node to at least:

establish a security association with a client node, where establishing comprises at least one authentication message communicated from the client node indicating a name of an access point;
obtain at least one user identity and user authentication data for a user of the client node from an authentication server, to authenticate the user with the authentication data and establish the security association,
providing said at least one user identity and an indication of said access point to a gateway node;
provide an address allocated by said access point to said client node;
receive said packet comprising said address as source address;
allow said packet based on said authorization pertaining to said at least one access point and firewall rules allowing communication by said access point for said source address to a destination address indicated in said packet; and
route said packet toward a destination node based on at least said destination address.

19. An apparatus, comprising:
at least one processor; and
at least one memory storing computer program code, where the at least one memory storing the computer program code is configured, by the at least one processor, to cause the apparatus to at least:
establish a security association with a client node, where the establishing comprises at least one authentication message communicated from the client node indicating a name of an access point;
obtain at least one user identity and user authentication data for a user of the client node from an authentication server;
authenticate the user with the authentication data and establish the security association;
provide said at least one user identity and an indication of said access point to a gateway node;
provide an address allocated from said access point to said client node;
receive a packet comprising said address as source address;
allow said packet based on said authorization pertaining to said at least one access point and firewall rules allowing communication by said access point for said source address to a destination address indicated in said packet; and
route said packet toward a destination node based on at least said address.

20. A network node, comprising:
at least one processor; and
at least one memory storing computer program code, where the at least one memory storing the computer program code is configured, by the at least one processor, to cause the network node to at least:
obtain an identity of an access point in at least one authentication message during initialization of a security association with a client node;
   obtain at least one user identity and user authentication data for a user of the client node from an authentication server;
   authenticate the user with the authentication data and establish the security association;
   provide said at least one user identity and an indication of said access point to a control node;
   obtain for the user authorization pertaining to said access point, an address allocated from said access point for said client node;
   provide said address to said client node;
   receive a packet from said client node, said packet comprising said address as source address;
   allow said packet based on said authorization pertaining to said at least one access point and firewall rules allowing communication by said access point for said source address to a destination address indicated in said packet; and
   route said packet toward a destination node based on at least said destination address.

21. An apparatus, comprising:
at least one processor; and
at least one memory storing computer program code, where the at least one memory storing the computer program code is configured, by the at least one processor, to cause the apparatus to at least:
obtain an identity of an access point in at least one authentication message during initialization of a security association with a client node;
obtain at least one user identity and user authentication data for a user of the client node from an authentication server;
authenticate the user with the authentication data;
provide said at least one user identity and an indication of said access point to a control node;
obtain for the user authorization pertaining to said access point;
obtain an address allocated from said access point for said client node;
provide said address to said client node;
receive a packet from said client node, said packet comprising said address as source address;
allow said packet based on said authorization pertaining to said at least one access point and firewall rules allowing communication by said access point for said source address to a destination address indicated in said packet; and
route said packet toward a destination node based on at least said destination address.

22. A network node, comprising:
at least one processor; and
at least one memory storing computer program code, where the at least one memory storing the computer program code is configured, by the at least one processor, to cause the network node to at least:
establish a security association with a client node, where establishing comprises at least one authentication message communicated from the client node indicating an identity of an access point;
obtain at least one user identity and user authentication data from an authentication server;
request a creation of a packet data protocol context from a second gateway node, where said request comprises said at least one user identity and an indication of said access point;
authenticate the user with the authentication data;
receive said packet data protocol context, where session control node information is included in at least one protocol configuration option of said packet data protocol context; and
provide said session control node information to said client node in a configuration payload of a security association related message.

23. An apparatus, comprising:
at least one processor; and
at least one memory storing computer program code, where the at least one memory storing the computer program code is configured, by the at least one processor, to cause the apparatus to at least:

establish a security association with a client node, where establishing comprises at least one authentication message communicated from the client node indicating an identity of an access point;

obtain at least one user identity and user authentication data for a user of the client node from an authentication server;

request a creation of a packet data protocol context from a second gateway node, receive said packet data protocol context, where session control node information is included in at least one protocol configuration option of said packet data protocol context;

authenticate the user with the authentication data; and provide said session control node information to said client node in a configuration payload of a security association related message.

24. A non-transitory computer readable medium embodying a computer program, the computer program executable by a data processor to perform:

establishing a security association with a client node, where establishing comprises at least one authentication message communicated from the client node indicating an identity of an access point;

obtaining at least one user identity and user authentication data for a user of the client node from a server;

authenticating the user with the authentication data;

providing said at least one user identity and an indication of said access point to a gateway node;

providing an address allocated from said access point to said client node;

receiving a packet comprising said address as source address;

allowing said packet based on said authorization pertaining to said access point and firewall rules allowing communication by said access point for said source address to a destination address indicated in said packet; and routing said packet toward a destination node based on at least said destination address.

25. The computer readable medium according to claim 24, wherein said computer readable medium is a removable memory card.

26. The computer readable medium according to claim 24, wherein said computer readable medium is a removable memory device.

27. The computer readable medium according to claim 24, wherein said computer readable medium is a magnetic disk, a holographic memory or an optical disk.

28. A non-transitory computer readable medium embodying a computer program, the computer program executable by a data processor to perform:

obtaining an identity of an access point in at least one authentication message communicated during initialization of a security association with a client node;

obtaining at least one user identity and user authentication data for a user of the client node from an authentication server;

authenticating the user with the authentication data and establishing the security association;

providing said at least one user identity and an indication of said access point to a control node;

obtaining for the user authorization pertaining to said access point;

obtaining an address allocated from said access point for said client node;

providing said address to said client node;

receiving a packet from said client node, said packet comprising said address as source address;

allowing said packet based on said authorization pertaining to said at least one access point and firewall rules allowing communication by said at least one access point for said source address to a destination address indicated in said packet; and routing said packet toward a destination node based on at least said destination address.

29. The computer readable medium according to claim 28, wherein said computer readable medium is a removable memory card.

30. The computer readable medium according to claim 28, wherein said computer readable medium is a removable memory device.

31. The computer readable medium according to claim 28, wherein said computer readable medium is a magnetic disk, a holographic memory or an optical disk.

32. A non-transitory computer readable medium embodying a computer program, the computer program executable by a data processor to perform:

establishing a security association with a client node, where establishing comprises at least one authentication message communicated from the client node indicating an identity of an access point;

obtaining at least one user identity and user authentication data for a user of the client node from an authentication server;

requesting a creation of a packet data protocol context from a second gateway node, authenticating the user with the authentication data, where said request comprises said at least one subscriber identity and an indication of said access point;

receiving said packet data protocol context, where session control node information is included in at least one protocol configuration option of said packet data protocol context; and providing said session control node information to said client node in a configuration payload of an security association related message.

33. The computer readable medium according to claim 32, wherein said computer readable medium is a removable memory card.

34. The computer readable medium according to claim 32, wherein said computer readable medium is a removable memory device.

35. The computer readable medium according to claim 32, wherein said computer readable medium is a magnetic disk, a holographic memory or an optical disk.

* * * * *